Figure 1:
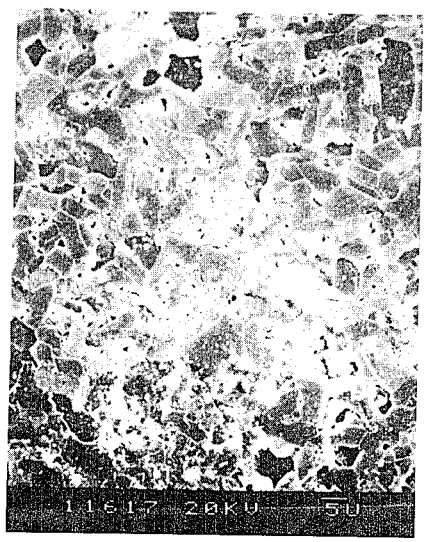

United States Patent [19]

Yamada et al.

[11] Patent Number: 4,770,829

[45] Date of Patent: Sep. 13, 1988

[54] METHOD FOR PRODUCING SINTERED SILICON CARBIDE PRODUCT

[75] Inventors: Koichi Yamada; Masahide Mouri, both of Niihama, Japan

[73] Assignee: Sumitomo Chemical Company, Limited, Osaka, Japan

[21] Appl. No.: 865,865

[22] Filed: May 22, 1986

[30] Foreign Application Priority Data

May 22, 1985 [JP] Japan .................. 60-109700

[51] Int. Cl.⁴ .......................... C04B 35/36
[52] U.S. Cl. ........................ 264/65; 501/90
[58] Field of Search ............. 264/65; 501/90

[56] References Cited

U.S. PATENT DOCUMENTS 4,041,117  8/1977  Prochazka ................ 264/63
4,312,954  1/1982  Coppola et al. .......... 501/90

FOREIGN PATENT DOCUMENTS 0157586  10/1985  European Pat. Off. .
2313331  12/1976  France .
2007635   5/1979  United Kingdom .

OTHER PUBLICATIONS

Chemical Abstracts, vol. 99, No. 18, 1983, p. 301, 144921t.

Primary Examiner—James Derrington
Attorney, Agent, or Firm—Wenderoth, Lind & Ponack

[57] ABSTRACT

A method for producing wear-resistant sintered silicon carbide products as provided herein in which 90 to 50 wt. % of β-SiC having an average particle diameter of not more than one micron is mixed with 10 to 50 wt. % of α-SiC having an average particle size which is not more than one micron but not less than 1.15 times as large as that of the β-SiC, and wherein tar pitch and a boron compound are added as densification aids to the powdery SiC mixture; the amount of the tar pitch being present in an amount necessary to provide the total carbon content of the powdery SiC mixture, and in a range of 4 wt. % to less than 8 wt. %; and wherein the boron compound is present in an amount of 0.03 wt. % to less than 0.15 wt. % as boron, based upon the powdery SiC mixture and wherein the resulting mixture is molded and sintered at a temperature of from 2050° to 2300° C. in an inert atmosphere. The molded products are superior in mechanical strength and wear resistance as opposed to conventional sintered silicon carbide products.

3 Claims, 1 Drawing Sheet

METHOD FOR PRODUCING SINTERED SILICON CARBIDE PRODUCT

The present invention relates to a method for producing sintered silicon carbide products of high density as well as of excellent mechanical strength and wear resistance. More particularly, it relates to a method for producing sintered silicon carbide products of high density as well as of excellent mechanical strength and wear resistance which comprises mixing silicon carbides having particle diameters in a specific ratio and different crystal forms at a specific proportion of weight, and adding specific amounts of a specific carbon-containing substance and a boron compound as densification aids to the mixture which is then molded and sintered under an inert atmosphere.

Silicon carbide has excellent physical and chemical properties and particularly, because of its high hardness and corrosion resistance as well as its mechanical properties which do not change even at elevated temperatures from those at a normal temperature, it has been regarded as promising as wear-resistant materials and high-temperature structural materials. But, sintering of silicon carbide is too difficult to obtain a high-density sintered product by the usual method, and therefore, sintering by the hot press method, sintering with densification aids, etc. have been proposed.

For example, Japanese Patent Application Kokai No.148712/1976 discloses that high-density sintered silicon carbide products are obtained by mixing 91 to 99.35 parts by weight of $\alpha$-phase silicon carbide having a specific surface area of 1 to 100 m$^2$/g, 0.67 to 20 parts by weight of a carbonizable, organic solvent-soluble organic material having a carbonization rate of 25 to 75% by weight, 0.15 to 3.0 parts by weight of a boron-containing boron source and 5 to 15 parts by weight of a temporary binding agent, and sintering the resulting mixture.

This method surely provides high-density sintered silicon carbide products, which are, however, sometimes markedly weakened in the mechanical properties because the boron compound added as a densification aid remains in the grain boundary of the formed sintered silicon carbide products. Previously, the present inventors found that sintered products superior in mechanical strength can be obtained without causing a reduction in a sintering density when a specific amount of a specific carbonaceous substance is added even if the amount of boron is reduced to a level below the amount so far generally regarded as necessary to raise the sintering density in the sintering of silicon carbide, and applied for a patent.

In the method of the above cited prior patent application, however, there was a case wherein the growth of grains by boron is not so promoted as expected because of a decreased amount of boron, as a result of which the formed sintered product has a small grain size, being inferior in wear resistance to sintered products having a large grain size.

In view of the situation like this, the present inventors extensively studied to obtain high-density sintered silicon carbide products superior in mechanical strength and wear resistance, and as a result, found that when $\alpha$-phase silicon carbide and $\beta$-phase silicon carbide, of which the particle diameters are in a specific ratio, are mixed at a specific proportion of weight, and specific amounts of a specific carbon-containing substance and a boron compound are added as densification aids to the mixture which is then sintered, sintered silicon carbide products having a uniform and large grain diameter can be obtained even if the amount of boron is reduced. The present inventors thus completed the present invention.

According to the present invention, there is provided a method for producing wear-resistant sintered silicon carbide products characterized in that 90 to 50 wt. % of $\beta$-SiC having an average particle diameter of not more than 1$\mu$ is mixed with 10 to 50 wt. % of $\alpha$-SiC having an average particle diameter which is not more than 1$\mu$ but not less than 1.5 times as large as that of $\beta$-SiC, tar pitch and a boron compound are added as densification aids to the powdery SiC mixture, the amount of the former being an amount necessary for the total carbon content of the above powdery SiC mixture and the tar pitch to be in a range of more than 4 wt. % to less than 8 wt. %, and that of the latter being more than 0.03 wt. % to less than 0.15 wt. %, as converted to boron, based on the powdery SiC mixture, the resulting mixture is molded and the molded product is then sintered at a temperature of from 2050° to 2300° C. in an inert atmosphere.

The method of the present invention will be illustrated in moro detail hereinafter.

What is essential to the silicon carbide powders, $\alpha$-SiC and $\beta$-SiC, used in the method of the present invention is that both $\alpha$-SiC and $\beta$-SiC have an average particle diameter of not more than 1$\mu$, and besides that the average particle diameter of $\alpha$-SiC is not less than 1.5 times as large as that of $\beta$-SiC. The average particle diameter of $\beta$-SiC is preferably in the range of 0.1 to 0.5$\mu$, and that of $\alpha$-SiC is preferably in the range of 0.2 to 0.8$\mu$. When the average particle diameter exceeds 1$\mu$, sintering becomes so difficult that high-density sintered products are not obtained. When the average particle diameter of $\alpha$-SiC is less than 1.5 times as large as that of $\beta$-SiC, control of the growth of SiC grains, formed by the phase transition of $\beta$-SiC to $\alpha$-SiC, becomes difficult, and as a result, plate-like abnormally large grains which have grown up to more than several ten microns in size are formed. The sintered product obtained, therefore, has a mixed structure comprising plate-like $\alpha$-SiC ranging from several ten microns to several hundred microns in size and fine $\alpha$-SiC ranging from several microns to several ten microns in size. The plate-like abnormally large particles cause breakdown when mechanical stress is applied thereto to lower the mechanical strength of the sintered product, so that the formation of such particles is not preferred.

The reason why the original $\alpha$-SiC present in the material inhibits the abnormal growth of the particles formed by the phase transition of $\beta$-SiC to $\alpha$-SiC, is not clear. But, the following may be thought: The growing SiC particles, formed by the phase transition, collide with the original thermodynamically stable $\alpha$-SiC particles forming a uniform disperse system to stop their growth at the point when they have grown up to a dimension corresponding to the dispersion distance of the system.

Generally, silicon carbide used as a material contains about 0.2 to about 2 wt. % of free carbon, and this is also the same with the silicon carbide powder used in the present invention.

In practicing the method of the present invention, a boron compound and tar pitch are incorporated in the silicon carbide powder, the amount of the former being more than 0.03 wt. % to less than 0.15 wt. %, as converted to boron, of the powder, and that of the latter being an amount necessary for the total carbon content of the powder and the tar pitch to be more than 4 wt. % to less than 8 wt. % after carbonization. When the amount of the boron compound is not more than 0.03 wt. %, as converted to boron, of the silicon carbide powder, the sintering density unpreferably lowers. While, when said amount is not less than 0.15 wt. %, high-density sintered products are obtained but a high mechanical strength is not obtained because boron present in the grain boundary lowers the binding power between the grains. Also, when the amount of tar pitch is such that the total of the carbon content of the tar pitch and the content of free carbon contained in the silicon carbide powdery mixture becomes not more than 4 wt. %, high-density sintered products are not obtained. While, when said amount is such that said total becomes not less than 8 wt. %, the mechanical strength of sintered products obtained unpreferably lowers.

The boron compound usable in the present invention is not particularly limited, but generally, those which exist stably up to a sintering temperature at which sintered products, an object, are produced and besides have a high boron content, are preferred. Specifically, there are given boron, boron carbide, etc. Also, there is no special limitation to tar pitch, but the use of organic solvent-soluble coal tar pitch or oil tar pitch having a carbonization rate of 40 to 60 wt. % is preferred.

In practicing the method of the present invention, firstly the silicon carbide powder, boron compound and tar pitch in the proportion of weight as described above are mixed uniformly using water or an organic solvent such as benzene, quinoline, anthracene, etc. The uniform mixture is molded by slip casting; or it is dried as it is or granulated by spray drying and pressure-molded by press molding; or it is mixed with an organic binder and molded by extrusion molding or injection molding. The molded product thus obtained is machined or treated to remove the binder if necessary, and then sintered at a temperature ranging from 2050° to 2300° C. in an inert atmosphere such as argon, helium, nitrogen, etc. When the sintering temperature is lower than 2050° C., the sintered product obtained has an α-phase/β-phase mixed structure and an average grain diameter of 8μ or less, being inferior in wear resistance. While, when the sintering temperature exceeds 2300° C., vaporization of silicon carbide and formation of coarse grains take place to cause undesirable reduction in mechanical strength. The sintering time is generally in a range of 10 minutes to 10 hours.

In sintering the molded product, a vacuum atmosphere may be used in place of the inert atmosphere. More preferably, such a sintering method is recommended that the molded product is first burned in a vacuum until the carbon content of the product is reduced to 2 wt. % or less, and then sintered in an inert atmosphere, because thick molded products can be sintered in high density. In this method, the temperature employed is 2000° C. or less for burning in a vacuum and 2050° to 2300° C. for sintering in an inert atmosphere.

In the method of the present invention, the mixing ratio of β-SiC to α-SiC is 90-50 wt. % to 10-50 wt. %. When the amount of β-SiC exceeds 90 wt. %, it becomes difficult to inhibit the abnormal growth of particles formed by the phase transition of β-SiC to α-SiC. While, when said amount is less than 50 wt. %, the growth of the particles formed by the phase transition is not uniform, and as a result, the sintered product obtained has a mixed structure composed of the original α-SiC micrograins of 5μ or less in size and the coarse grains of 5 to several ten microns in size formed by the phase transition. This sintered product, therefore, has a low wear resistance because the micrograins come off.

In the present invention, the carbon and boron contents and the bending strength of the sintered product were measured by the following methods.

Carbon content: Measured at 850° C. on MT-500W C Recorder (produced by Yanagimoto Co.).

Boron content: Measured by "Rapid Chemical Analysis of Silicon Carbide" (Report of Nagoya Industrial Technical Laboratory, Vol. 31, No. 3, pp. 39-43, March 1982).

Bending strength: According to JIS R 1601.

Figure 2:
Figure 3:
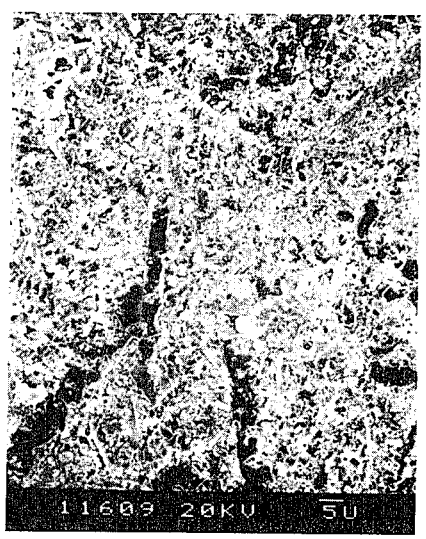

The present invention will be further illustrated with reference to the following examples and comparative examples and also by referring to the accompanying drawings wherein FIG. 1 is a photograph of the structure of a sintered silicon carbide product obtained in Example 1, and FIGS. 2 and 3 are a photograph of the structure of a sintered silicon carbide product obtained in Comparative examples 1 and 2, respectively.

EXAMPLE 1

After 8 g of coal tar pitch (carbon yield after carbonization, 50%) was dissolved in 12 g of quinoline, 200 g of benzene was added to the solution and mixed sufficiently. To the resulting solution were added 40 g of α-phase silicon carbide containing 1.0 wt. % of carbon and 98 wt. % of silicon carbide and having an average grain diameter of 0.6μ, 60 g of β-phase silicon carbide containing 0.6 wt. % of carbon and 97 wt. % of silicon carbide and having an average grain diameter of 0.3μ and 0.15 g of boron carbide of 1200 mesh or smaller in size, and the mixture was milled and mixed for 3 hours by means of a plastic ball mill. The resulting mixture was dried at 60° C. in a nitrogen gas stream, crushed and passed through a 180-mesh sieve. The powder obtained was cold-pressed, charged in a rubber mold and molded on a hydrostatic pressure press under a molding pressure of 1.5 tons/cm$^2$ to obtain moled products of 50×30×4 mm.

This molded product was heated to 2100° C. at a rate of 200° C./hour in an argon gas stream, and sintered at the same 30 minutes. The sintered product obtained had a carbon content of 1.0 wt. % and a sintering density of 3.13 g/cm$^3$. The section of this sintered product was polished and etched by chemical corrosion, and the etched structure was examined to find that the average grain diameter was 9μ. This sintered product had a bending strength of 60 kg/mm$^2$, and showed a wear rate of 6×10$^{-4}$ g/g (SiC/Al$_2$O$_3$ particles) on the wear test wherein molten alumina particles of 150μ in size are made to collide with this product at a rate of 50 m/sec.

The photograph of the structure is shown in FIG. 1.

COMPARATIVE EXAMPLE 1

After 8 g of coal tar pitch (carbon yield after carbonization, 50%) was dissolved in 12 g of quinoline, 200 g of benzene was added to the solution and mixed sufficiently. To the resulting solution were added 100 g of α-phase silicon carbide containing 1.0 wt. % of carbon and 98 wt. % of silicon carbide and having an average grain diameter of 0.6μ and 0.15 g of born carbide of 1200 mesh or smaller in size. Mixing on a plastic ball mill, drying, molding and sintering were carried out in the same manner as in Example 1.

The sintered product obtained had a carbon content of 1.2 wt. %, a sintering density of 3.14 g/cm$^3$ and an average grain diameter of 3μ. Also, this product had a bending strength of 65 kg/mm$^2$, but it showed a wear rate of $10 \times 10^{-4}$ g/g on the wear test carried out in the same condition as in Example 1.

The photograph of the structure is shown in FIG. 2.

COMPARATIVE EXAMPLE 2

Forty grams of α-phase silicon carbide containing 1.5 wt. % of carbon and 97 wt. % of silicon carbide and having an average particle diameter of 0.4μ and 60 g of the same β-phase silicon carbide as used in Example 1 were mixed, dried, molded and sintered in the same conditions as in Example 1.

The sintered product obtained had a sintering density of 3.12 g/cm$^3$ and a mixed structure composed of grains of 1 to 5μ in size and ones of 10 to 100μ in size. This product had a bending strength of 50 kg/mm$^2$, and showed a wear rate of $15 \times 10^{-4}$ g/g on the wear test carried out in the same condition as in Example 1.

The photograph of the structure is shown in FIG. 3.

EXAMPLES 2 to 4 and COMPARATIVE EXAMPLES 3 to 9

The molded product was prepared and sintered in conditions described in Table 1, and the physical properties of the resulting sintered product were measured. The results are shown in Table 1.

by mixing α-phase silicon carbide and β-phase silicon carbide, of which the particle diameters are in a specific ratio, at a specific proportion of weight, adding specific amounts of a specific carbon-containing substance and a boron compound as densification aids, and sintering the resulting mixture. Thus, the sintered product of the present invention can be supplied as a useful wear-resistant material for sliding parts such as mechanical seal, etc. as well as for sand blasts, etc. The present invention, therefore, has a very large industrial value.

What is claimed is:

1. A method for producing wear-resistant sintered silicon carbide products characterized in that 90 to 50 wt. % of β-phase SiC having an average particle diameter of not more than 1μ is mixed with 10 to 50 wt. % of α-SiC having an average particle diameter which is not more than 1μ but not less than 1.5 times as large as that of β-SiC, tar pitch and a boron compound are added as densification aids to the powdery SiC mixture, the amount of the former being an amount necessary for the total carbon content of the above SiC powdery mixture and the tar pitch to be in a range of more than 4 wt. % to less than 8 wt. %, and that of the latter being more than 0.03 wt. % to less than 0.15 wt. %, as converted to boron, based on the SiC powdery mixture, molding the resulting mixture sintering and the molded product at a temperature of from 2050° to 2300° C. in an inert atmosphere.

2. A method as described in claim 1, wherein each of the powdery materials constituting the powdery SiC mixture contains 0.2 to 2 wt. % of free carbon.

TABLE 1

| | Diameter of mixed SiC particles | | Densification aid (%) | | Sintering condition | Remaining densification aid (%) | | Density | Bending strength | Wear rate | Particle diameter |
|---|---|---|---|---|---|---|---|---|---|---|---|
| | α-phase | α-phase | B$_4$C | Coal tar pitch | (°C. × min) | Boron | Carbon | (g/cm$^3$) | (kg/mm$^2$) | (g/g) | (μ) |
| Example 2 | 0.6μ 20% | 0.3μ 80% | 0.15 | 8 | 2100 × 30 | 0.1 | 1.0 | 3.10 | 55 | $4 \times 10^{-4}$ | 15 (mean value) |
| Example 3 | 0.6 40 | 0.3 60 | 0.15 | 8 | 2250 × 30 | 0.1 | 0.8 | 3.12 | 53 | $2 \times 10^{-4}$ | 19 (mean value) |
| Example 4 | 0.8 40 | 0.3 60 | 0.15 | 8 | 2100 × 30 | 0.1 | 1.0 | 3.08 | 58 | $5 \times 10^{-4}$ | 9 (mean value) |
| Comparative example 3 | — | 0.3 100 | 0.15 | 8 | 2100 × 30 | 0.1 | 0.7 | 3.11 | 50 | $12 \times 10^{-4}$ | 5–10 10–200 |
| Comparative example 4 | 0.6 40 | 0.3 60 | 0.02 | 8 | 2100 × 30 | 0.02 | 1.5 | 2.75 | 28 | $60 \times 10^{-4}$ | 2–8 10–200 |
| Comparative example 5 | 0.6 40 | 0.3 60 | 0.3 | 8 | 2100 × 30 | 0.2 | 0.6 | 3.12 | 48 | $8 \times 10^{-4}$ | 12 (mean value) |
| Comparative example 6 | 0.6 40 | 0.3 60 | 0.15 | 4 | 2100 × 30 | 0.1 | 0.6 | 2.65 | 25 | $80 \times 10^{-4}$ | 5–20 30–500 |
| Comparative example 7 | 0.6 60 | 0.3 40 | 0.15 | 8 | 2100 × 30 | 0.1 | 1.2 | 3.11 | 52 | $15 \times 10^{-4}$ | 1–5 10–100 |
| Comparative example 8 | 0.6 40 | 0.3 60 | 0.15 | 8 | 2000 × 30 | 0.11 | 1.2 | 3.09 | 53 | $11 \times 10^{-4}$ | 6 (mean value) |
| Comparative example 9 | 0.6 40 | 0.3 60 | 0.15 | 8 | 2350 × 30 | 0.08 | 0.9 | 3.00 | 35 | $40 \times 10^{-4}$ | 22 (mean value) |

According to the method of the present invention explained above in detail, it became possible to obtain sintered silicon carbide products having an average grain diameter of 8 to 20μ, a sintering density of 90% or more, preferably 95% or more of the theoretical value and excellent mechanical strength and wear resistance 3. A method as described in claim 1, wherein the molded product is sintered in a condition that the product is first burned in a vacuum until its carbon content is reduced to at least 2 wt. % or less and then sintered in an inert atmosphere.

* * * * *